UNITED STATES PATENT OFFICE.

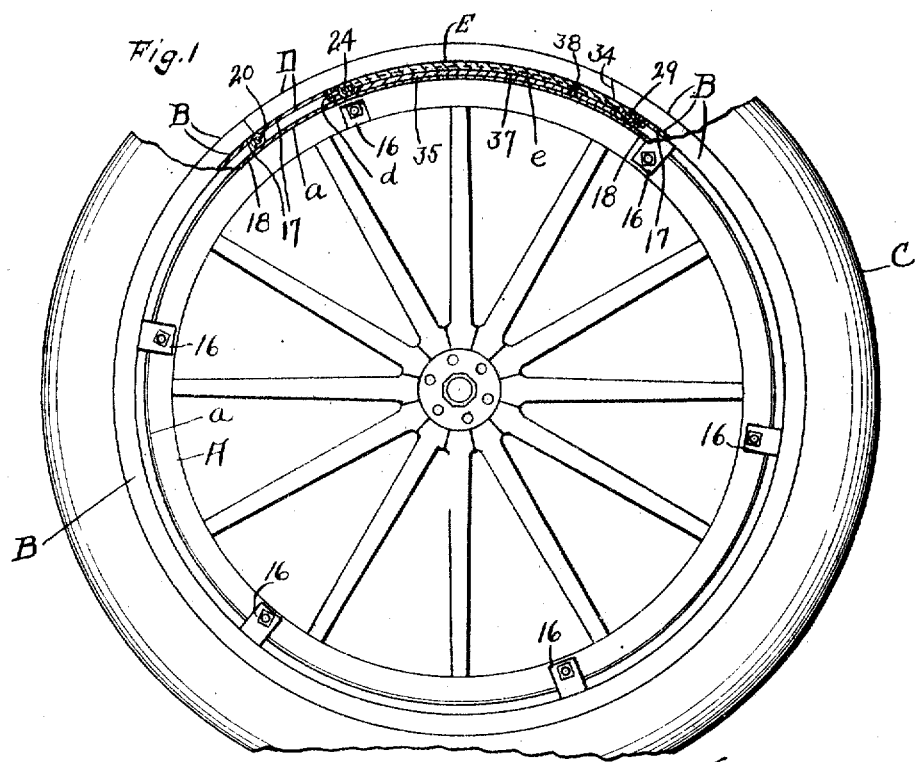
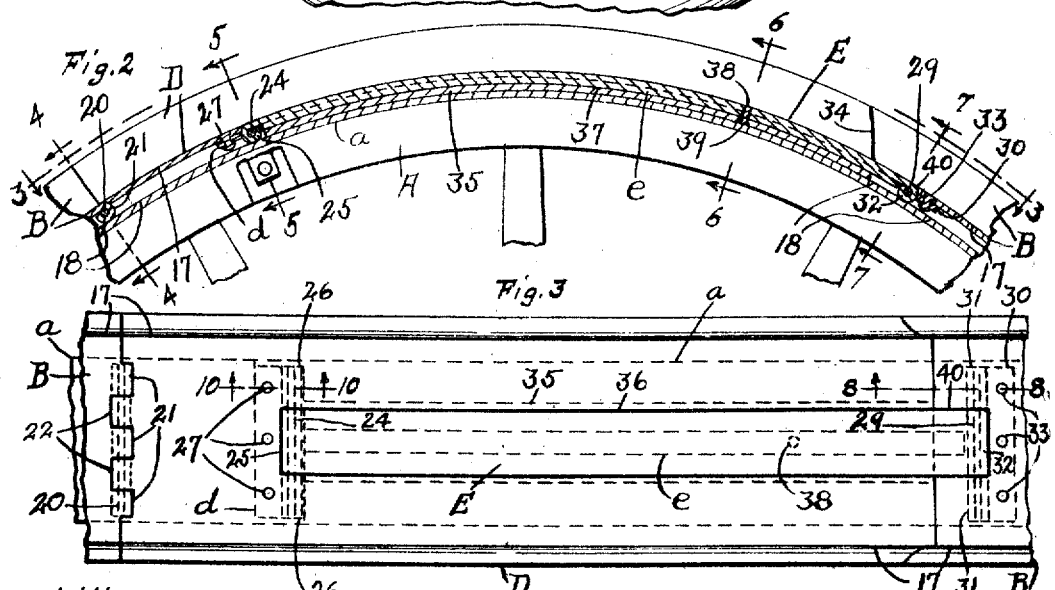

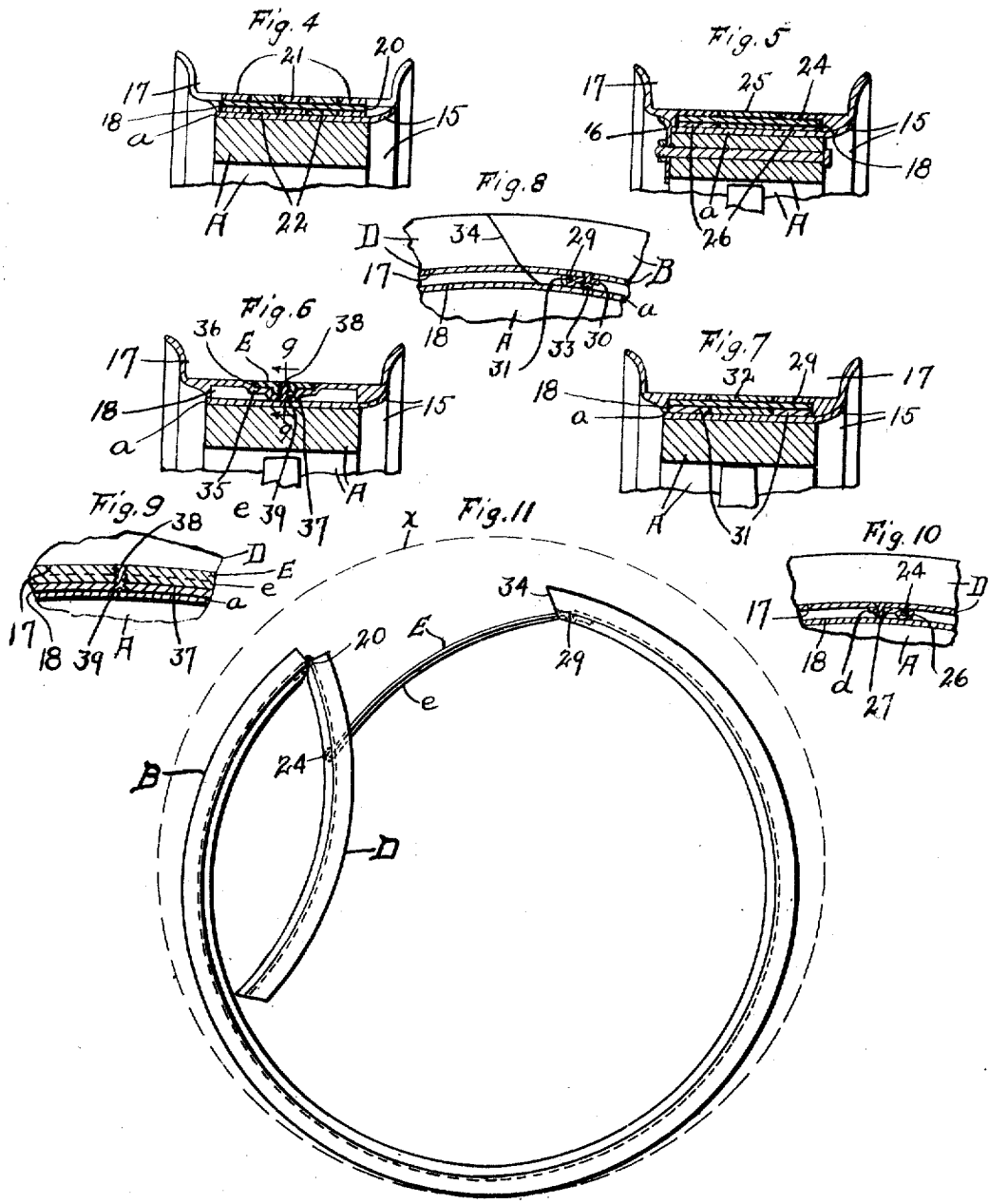

BENNO B. LEUSTIG, OF CLEVELAND, OHIO.

DEMOUNTABLE WHEEL-RIM.

1,272,467.     Specification of Letters Patent.     Patented July 16, 1918.

Application filed January 21, 1918. Serial No. 212,997.

*To all whom it may concern:*

Be it known that I, BENNO B. LEUSTIG, a citizen of the United States, residing at Cleveland, in the county of Cuyahoga and State of Ohio, have invented a new and useful Demountable Wheel-Rim, of which the following is a specification.

This invention relates to improvements in demountable wheel-rims, and pertains more especially to a detachable rim which is formed in sections in such a manner that said sections are capable of manipulation to permit the collapse and facilitate the removal of a tire from the rim and to expedite the application of a tire to the rim.

The primary object of this invention is to provide an improved sectional demountable rim which can be manipulated in such a manner that a tire can be easily and quickly applied to and removed from the rim.

Another object is to produce a sectional demountable rim which has a portion thereof capable of movement inwardly from the remainder of the rim and comprises means whereby said remainder of the rim is contracted during said movement so that a tire can be readily applied to and removed from the rim.

Another object is to have my improved rim not only comprise two sections which are in line endwise circumferentially of the axis of the rim and concentric relative to said axis and unequal in length, but to have the shorter section pivotally connected at one end to one end-portion of the longer section and arranged to be swung inwardly from the space between the ends of the longer section, and to provide means whereby said ends of the longer section are drawn toward each other during swinging of the shorter section inwardly from said space.

Another object is to facilitate the assemblage of the component parts of the rim, and to render the rim simple and durable in construction.

With these objects in view, and to attain any other object hereinafter appearing, this invention consists in certain features of construction, and combinations and relative arrangement of parts, hereinafter described in this specification, pointed out in the claims, and illustrated in the accompanying drawings.

In said drawings, Figure 1 is an elevation of an automobile-wheel having a tired demountable rim embodying my invention, and portions are broken away and in section in said figure to reduce the size of the drawing and to more clearly show the construction. Fig. 2 is a central section of a portion of a rim embodying my invention. Fig. 3 is a view taken along the curved line 3—3, Fig. 2. Figs. 4, 5, 6 and 7 are transverse sections taken along the lines 4—4, 5—5, 6—6 and 7—7, respectively, Fig. 2, looking in the direction indicated by the arrows. Fig. 8 is a section taken along the line 8—8, Fig. 3. Fig. 9 is a section, in detail, taken along the line 9—9, Fig. 6. Fig. 10 is a section taken along the line 10—10, Fig. 3. Fig. 11 is an elevation of a rim embodying my invention and illustrative of the manner of manipulating the rim preparatory to applying a tire to the rim and preparatory to removing a tire from the rim. Figures from 2 to 10, inclusive, are drawn on a larger scale than Figs. 1 and 11.

Referring to said drawings, A indicates the felly of a vehicle-wheel. Said felly is provided with a fixed circumferentially extending metal band *a* which at one side edge thereof projects outwardly, as at 15, and the other side edge of said band is overlapped by metal plates 16 which are spaced circumferentially of the axis of the felly and project outwardly beyond the outer circumference of said band and are secured to the felly in any approved manner. The felly-band *a* is surrounded by a demountable annular rim embodying my invention, and said rim, upon applying it to said band, is arranged between the outwardly projecting portion 15 of said band and the plates 16.

My improved demountable rim is shown comprising two sections B and D of unequal length. Said sections are in line endwise circumferentially of the axis of the rim and concentric relative to said axis and adapted to be embraced circumferentially of the rim by a tire C shown applied to the rim in Fig. 1. Said rim has such contour in cross-section as to form a circumferentially extending annular channel or recess 17 externally of the rim for the reception of said tire, and of course said recess is concentric relative to the axis of the rim. The shorter rim-section D is essentially less in length than half of the distance around the rim and preferably longer than one-eighth of said distance and preferably not longer than one-fourth of said distance. My improved rim is provided internally,—that is, at its inner circumferential surface,—with a recess 18 which has less width than the felly-band *a* and extends circumferentially of and is concentric relative to the axis of the rim, and the rim, when in place relative to said band, engages and surrounds said band at the sides of said recess.

The shorter rim-section D (see Figs. 1, 2, 3 and 4) is pivotally connected, at one end, to one end of the longer and main rim-section B, and the pivotal connection formed between said end of said main section and the aforesaid pivoted and shorter section comprises a pivotal pin 20 which extends transversely of the recess 18 and is substantially parallel with the axis of the rim and arranged within ears 21 formed on the main section B and within ears 22 formed on the pivoted section D so as to render said pivoted section capable of being swung inwardly, when free to swing inwardly, from within the space between the ends of the main section, and of course adjacent end-portions of said rim-sections are contoured as required to permit swinging of said pivoted section inwardly into the position shown in Fig. 11.

A curved link E, which is concentric relative to the axis of the rim, is (see Figs. 1, 2, 3 and 5) pivotally connected at one end to the pivoted rim-section D at a point intermediately of the free end and the axis of said pivoted rim-section, and the pivotal connection between said end of said link and said pivoted rim-section comprises a pivotal pin 24 which extends transversely of the recess 18 and is substantially parallel with the axis of said pivoted rim-section, and consequently substantially parallel with the axis of the rim, and arranged within an ear 25 formed on the link E and within half-ears 26 formed on a plate *d* which is arranged at the inner side of and riveted, as at 27, to said pivoted rim-section. By the construction hereinbefore described it will be observed that the rim-section D is pivoted at one end thereof to one end-portion of the longer and main rim-section B and is pivoted, intermediately of its ends, and preferably farther from its free extremity than from its axis, to one end of a link E which (see Figs. 1, 2, 3 and 7) is pivotally connected at its other end to the other end-portion of said main rim-section, and the pivotal connection between said pivoted rim-section and the last-mentioned end-portion of the main rim-section comprises a pivotal pin 29 which extends transversely of the recess 18 and is substantially parallel with the axis of the pivoted rim-section, and consequently substantially parallel with the axis of the rim, and arranged within an ear 32 formed on the link E and within half-ears 31 formed on a plate 30 which is arranged at the inner side of and riveted, as at 33, to said main rim-section. It will be observed that the shorter and pivoted rim-section D forms a lever fulcrumed at one end to one end-portion of the remainder of the rim, that said lever is arranged to swing inwardly, and that the link E is arranged to draw the end-portions of said remainder of the rim toward each other, as shown in Fig. 11, during inward swinging of said lever or pivoted rim-section. It will also be observed that the side walls of the internal recess 18 in the rim serve to exclude dust and dirt from the pivotal pins 20, 24 and 29.

The main rim-section B has its end-portion, to which the link E is pivotally connected, provided with an inwardly beveled end face 34 which is preferably arranged nearer the axis of the pivoted rim-section D than the pivotal connection between said link and said end-portion of said main rim-section, and said end face is overlapped by the adjacent end face of said pivoted rim-section. The joint formed between the free end of said pivoted rim-section and the adjacent end of the main rim-section is arranged therefore diagonally of the rim and preferably substantially concentric relative to the axis of the pivoted rim-section to facilitate inward movement of said pivoted rim-section. The arrangement of said joint nearer the axis of the pivoted rim-section D than the pivotal connection between the link E and the main rim-section B is helpful in the formation of a tight joint, as desired, between the free end of the pivoted rim-section and the main rim-section, and obviously the main rim-section has enough resiliency to yield to and therefore avoid interference with the swinging of the pivoted rim-section inwardly notwithstanding a normally tight joint between the free end of said pivoted rim-section and the main rim-section.

The link E is preferably arranged centrally between the longitudinal edges of the pivoted rim-section D which is offset inwardly, as at 35, centrally between the longitudinal edges of said rim-section, and the offset portion 35 of said rim-section extends endwise of said rim-section and forms a recess 36 arranged at the outer side and extending longitudinally of said rim-section between the end face 34 of the main rim-section B and the pivotal connection between said link and the pivoted rim-section D and adapted to receive said link flush at its outer side with the adjacent portions of the bottom of the recess 17. The link E therefore engages and extends endwise of the recess 36. Preferably the bottom of the recess 36 in the pivoted rim-section D is provided centrally between the longitudinal edges of said rim-section with a groove 37 extending endwise of said rim-section, and the link E is shown provided at its inner side and centrally between its longitudinal edges with a stiffening rib e extending longitudinally of the link and engaging said groove.

Preferably the link E is detachably secured, by a screw 38, to the pivoted rim-section D, and said screw is arranged between the free end of said rim-section and the pivotal connection between said rim-section and said link and threaded into said link, being shown screwed into said link at the rib e from the inner side of the link and having a head 39 countersunk in said rim-section. Obviously therefore said screw is withdrawn from said link preparatory to the manipulation of the rim to reduce or contract the rim, from its expanded and normal position indicated by the reference-letter x in Fig. 11, to such an extent, as shown in solid lines, Fig. 11, as will facilitate the application of a tire to and its removal from the rim.

I would here remark that the main and longer rim-section B is slotted or cut away, as at 40, to accommodate the location and operation of the link E; that said link is, upon the application of a tire thereto, covered at its outer side by said tire, and that said link, being arranged within the recess 36 and flush at its outer side with the bottom of the recess 17, does not interfere with said tire and is adequately housed and protected.

What I claim is:—

1. A demountable wheel-rim provided internally with an annular recess which is concentric relative to the axis of the rim and comprising two sections which are unequal in length and in line endwise circumferentially of said axis, the shorter of said sections being pivotally connected at one end to the longer of said sections and arranged to be swung inwardly, and means whereby the ends of the longer rim-section are drawn toward each other during inward swinging of the shorter rim-section, the pivotal connection between said rim-sections comprising a pivotal pin extending transversely of the aforesaid recess, said rim-sections having members embracing said pin, and said pin and said pin-embracing members occupying portions of said recess.

2. A demountable wheel-rim provided internally with an annular recess which is concentric relative to the axis of the rim and comprising two sections which are unequal in length and in line endwise circumferentially of said axis, the shorter of said sections being pivotally connected at one end to one end-portion of the longer of said sections and arranged to swing inwardly, and a link pivotally connected at one end to the shorter rim-section at a point intermediately of the free end and the axis of said shorter rim-section, said link being pivotally connected at its other end to the other end-portion of the longer rim-section, the pivotal connection between said link and the shorter rim-section comprising a pivotal pin extending transversely of the aforesaid recess, and a plate arranged adjacent said pin at the inner side of and secured to said shorter rim-section, said plate and said link having members embracing said pin, and said pin and said pin-embracing members occupying portions of said recess.

3. In a demountable wheel-rim provided internally with a recess extending circumferentially of the axis of the rim, the combination, with two sections which are in line endwise circumferentially of and concentric relative to said axis and unequal in length, the shorter rim-section being pivotally connected at one end to one end-portion of the longer rim-section and arranged to swing inwardly, of a link pivotally connected at one end to the shorter rim-section at a point intermediately of the free end and the axis of said shorter rim-section, said link being pivotally connected at its other end to the other end-portion of the longer rim-section, and the pivotal connection between the link and the last-mentioned end-portion of the longer rim-section comprising a pivotal pin extending transversely of the aforesaid recess and a plate arranged adjacent said pin at the inner side of and secured to said longer rim-section, and said plate and said link having members embracing said pin.

4. In a demountable wheel-rim, the combination, with two sections which are in line endwise circumferentially of and concentric relative to the axis of the rim and unequal in length, the shorter rim-section being pivotally connected at one end to one end-portion of the longer rim-section and arranged to swing inwardly, of a link pivotally connected at one end to the shorter rim-section at a point intermediately of the free end and the axis of said shorter rim-section and pivotally connected at its other end to the other end-portion of the longer rim-section, the end face of the last-mentioned end-portion of said longer rim-section being overlapped by the adjacent end face of said shorter rim-section and arranged nearer the axis of said shorter rim-section than the pivotal connection between said link and said last-mentioned end-portion of said longer rim-section.

5. In a demountable wheel-rim provided externally with a recess which extends circumferentially of the rim and is adapted to be engaged by a tire, the combination, with two rim-sections which are in line endwise circumferentially of the rim and unequal in length, the shorter rim-section extending along the aforesaid recess and being connected at one end to one end-portion of the longer rim-section as required to render said shorter rim-section capable of being swung inwardly, of a link forming an operative connection between said rim-sections and connected at one end to the shorter rim-section at a point intermediately of the free end and the axis of said shorter rim-section and connected at its other end to the other end portion of the longer rim-section, the shorter rim-section being provided at the bottom of the aforesaid recess with a recess which extends longitudinally of said shorter rim-section, and the aforesaid link engaging the last-mentioned recess.

6. In a demountable wheel-rim provided externally with a recess which extends circumferentially of the rim and is adapted to be engaged by a tire, the combination, with two rim-sections which are in line endwise circumferentially of the rim and unequal in length, the shorter rim-section extending along the aforesaid recess and being connected at one end to one end-portion of the longer rim-section as required to render said shorter rim-section capable of being swung inwardly, of a link forming an operative connection between said rim-sections and attached at one end to the shorter rim-section at a point intermediately of the free end and the axis of said shorter rim-section and attached at its other end to the other end-portion of the longer rim-section, the shorter rim-section having an inwardly offset portion extending longitudinally of said rim-section, and the aforesaid link being arranged internally and extending endwise of said offset portion and being substantially flush at its outer side with the bottom of the aforesaid recess.

7. In a demountable wheel-rim provided externally with an annular recess arranged concentrically relative to the axis of the rim, the combination, with two sections which are in line endwise circumferentially of and concentric relative to said axis and unequal in length, the shorter rim-section being pivotally connected at one end to one end-portion of the longer rim-section and arranged to swing inwardly, of a link pivotally connected at one end to the shorter rim-section at a point intermediately of the free end and the axis of said shorter rim-section and pivotally connected at its other end to the other end-portion of the longer rim-section, the shorter rim-section being provided at the bottom of the aforesaid recess with a recess which extends longitudinally of said shorter rim-section, and said link engaging the last-mentioned recess.

8. In a demountable wheel-rim provided externally with an annular recess arranged concentrically relative to the axis of the rim, the combination, with two sections which are in line endwise circumferentially of the axis of the rim and concentric relative to said axis and unequal in length, the shorter rim-section being pivotally connected at one end to one end-portion of the longer rim-section and arranged to swing inwardly, of a link pivotally connected at one end to the shorter rim-section at a point intermediately of the free end and the axis of said shorter rim-section and pivotally connected at its other end to the other end-portion of the longer rim-section, the shorter rim-section having an inwardly offset portion extending longitudinally of said rim-section, and said link being arranged internally and extending endwise of said offset portion and being flush at its outer side with the bottom of the aforesaid recess.

9. In a demountable wheel-rim, the combination, with two sections which are arranged in line endwise circumferentially of the axis of the rim and concentric relative to said axis and unequal in length, the shorter rim-section being pivotally connected at one end to one end-portion of the longer rim-section and arranged to swing inwardly, of a link pivotally connected at one end to the shorter rim-section at a point intermediately of the free end and the axis of said shorter rim-section and pivotally connected at its other end to the other end-portion of the longer rim-section, said link being provided at its inner side and centrally between its longitudinal edges with a rib extending longitudinally of the link, and the shorter rim-section having a groove engaged by said rib.

10. In a demountable wheel-rim, the combination, with two sections which are in line endwise circumferentially of the axis of the rim and concentric relative to said axis and unequal in length, the shorter rim-section being connected at one end to one end-portion of the longer rim-section as required to render said shorter rim-section capable of being swung inwardly, of a link forming an operative connection between said rim-sections and attached at one end to the shorter rim-section at a point intermediately of the free end and the axis of said shorter rim-section and connected at its other end to the other end-portion of the longer rim-section, said link being detachably secured to the shorter rim-section between the free extremity of said shorter rim-section and the point at which said link is attached to said shorter rim-section.

11. In a demountable wheel-rim, the combination, with two sections which are in line endwise circumferentially of the axis of the rim and concentric relative to said axis and unequal in length, the shorter rim-section being pivotally connected at one end to one end-portion of the longer rim-section and arranged to swing inwardly, of a link pivotally connected at one end to the shorter rim-section at a point intermediately of the free end and the axis of said shorter rim-section and pivotally connected at its other end to the other end-portion of the longer rim-section, said link being detachably secured to the shorter rim-section between the free extremity of said shorter rim-section and the pivotal connection of said link to said shorter rim-section.

12. In a demountable wheel-rim, the combination, with two sections which are in line endwise circumferentially of the axis of the rim and concentric relative to said axis and unequal in length, the shorter rim-section being pivotally connected at one end to one end-portion of the longer rim-section and arranged to swing inwardly, and a link pivotally connected at one end to the shorter rim-section at a point intermediately of the free end and the axis of said rim-section and pivotally connected at its other end to the other end-portion of the longer rim-section, of a screw threaded into said link between the free extremity of the shorter rim-section and the pivotal connection of the link to said shorter rim-section and detachably securing said link to said shorter rim-section.

13. In a demountable wheel-rim, the combination, with two sections which are in line endwise circumferentially of the axis of the rim and concentric relative to said axis and unequal in length, the shorter rim-section being pivotally connected at one end to one end-portion of the longer rim-section and arranged to swing inwardly, and a link pivotally connected at one end to the shorter rim-section at a point intermediately of the free end and the axis of said rim-section and pivotally connected at its other end to the other end-portion of the longer rim-section, said link being provided at its inner side with a rib extending longitudinally of the link, and the shorter rim-section having a groove engaged by said rib, of a screw threaded into said link at said rib and having a head countersunk in said shorter rim-section.

In testimony whereof, I sign the foregoing specification, in the presence of two witnesses.

BENNO B. LEUSTIG.

Witnesses:
A. W. MASSEY,
CASPER J. DORER.